United States Patent
Zhao

(10) Patent No.: US 10,303,007 B2
(45) Date of Patent: May 28, 2019

(54) CURVED MONITOR AND CURVED DISPLAY PANEL THEREOF

(71) Applicant: Shenzhen China Star Optoelectronics Technology Co., Ltd., Shenzhen, Guangdong (CN)

(72) Inventor: Feng Zhao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 164 days.

(21) Appl. No.: 15/303,081

(22) PCT Filed: Sep. 14, 2016

(86) PCT No.: PCT/CN2016/098932
§ 371 (c)(1),
(2) Date: Oct. 10, 2016

(87) PCT Pub. No.: WO2018/032566
PCT Pub. Date: Feb. 22, 2018

(65) Prior Publication Data
US 2018/0180948 A1    Jun. 28, 2018

(30) Foreign Application Priority Data

Aug. 15, 2016   (CN) .......................... 2016 1 0670947

(51) Int. Cl.
*G02F 1/1333*   (2006.01)
*G02F 1/1343*   (2006.01)
(Continued)

(52) U.S. Cl.
CPC ...... *G02F 1/134309* (2013.01); *G02F 1/1333* (2013.01); *G02F 1/1368* (2013.01);
(Continued)

(58) Field of Classification Search
CPC ......... G02F 1/134309; G02F 1/133514; G02F 1/1368; G02F 2201/123
See application file for complete search history.

(56) References Cited

U.S. PATENT DOCUMENTS

2012/0320509 A1* 12/2012 Kim ..................... B32B 17/064
                                                          361/679.01
2014/0176856 A1* 6/2014 Lee ................... G02F 1/133305
                                                          349/61
(Continued)

FOREIGN PATENT DOCUMENTS

JP         2008096730 A  *  4/2008
JP         2010008875 A  *  1/2010

*Primary Examiner* — Hoan C Nguyen
(74) *Attorney, Agent, or Firm* — Andrew C. Cheng

(57) ABSTRACT

The disclosure discloses a curved display panel, the curved display panel includes a first curved substrate, a second curved substrate, a liquid crystal layer disposed between the first curved substrate and the second curved substrate, a first pixel element array disposed on the first curved substrate, a second pixel element array disposed on the second curved substrate. The first pixel element array at least includes a plurality of first pixel elements arranged linearly on the flattened first curved substrate, the second pixel element array at least includes a plurality of second pixel elements arranged linearly on the flattened second curved substrate correspondingly. The plurality of first pixel elements or the plurality of second pixel elements of at least one of the first pixel element array and the second pixel element array are arranged with unequal intervals.

17 Claims, 5 Drawing Sheets

(51) Int. Cl.
  *G06F 1/16*   (2006.01)
  *G09F 9/30*   (2006.01)
  *G02F 1/1335* (2006.01)
  *G02F 1/1368* (2006.01)
  *H04M 1/02*   (2006.01)

(52) U.S. Cl.
  CPC .. *G02F 1/133305* (2013.01); *G02F 1/133514* (2013.01); *G06F 1/1618* (2013.01); *G06F 1/1652* (2013.01); *G09F 9/301* (2013.01); *G02F 2201/123* (2013.01); *G06F 1/1641* (2013.01); *G09G 2380/02* (2013.01); *H04M 1/0268* (2013.01)

(56) References Cited

U.S. PATENT DOCUMENTS

| | | | | |
|---|---|---|---|---|
| 2014/0354938 | A1* | 12/2014 | Kim | C03C 15/00 |
| | | | | 349/160 |
| 2015/0055063 | A1* | 2/2015 | Hsieh | G02F 1/133753 |
| | | | | 349/99 |
| 2015/0261029 | A1* | 9/2015 | Park | G02F 1/13394 |
| | | | | 349/106 |
| 2017/0108743 | A1* | 4/2017 | Chu | G02F 1/133305 |
| 2017/0227805 | A1* | 8/2017 | Chong | G02F 1/133305 |

\* cited by examiner

CURVED MONITOR AND CURVED DISPLAY PANEL THEREOF

TECHNICAL FIELD

The disclosure relates to a curved display technical field, and more particularly to a curved monitor and a curved display panel thereof.

DESCRIPTION OF RELATED ART

According to a conventional curved display pixel structure, pixels on top and bottom substrates are arranged in a form of interval with an identical cycle.

As bending degrees of curved substrates on top and bottom are different, pixels on the substrates on top and bottom cannot be aligned vertically due to sliding displacement, a color impurity and light leakage will occur on left and right sides of the panel, resulting in a decline of display quality.

Therefore, a curved monitor and a curved display panel thereof need to be provided to solve the technical problem above.

SUMMARY

The disclosure provides a curved monitor and a curved display panel thereof, which can prevent the curved display panel from leaking light or a poor display performance caused by the color impurity.

To solve the technical problem above, the disclosure further provides a curved display panel. The curved display panel includes a first curved substrate, a second curved substrate, a liquid crystal layer disposed between the first curved substrate and the second curved substrate, a first pixel element array disposed on the first curved substrate, a second pixel element array disposed on the second curved substrate. The first pixel element array at least includes a plurality of first pixel elements arranged linearly on the flattened first curved substrate, the second pixel element array at least includes a plurality of second pixel elements arranged linearly on the flattened second curved substrate correspondingly. The plurality of first pixel elements or the plurality of second pixel elements of at least one of the first pixel element array and the second pixel element array are arranged with unequal intervals. Bending degrees of the first curved substrate and the second curved substrate are different. The first pixel elements and the second pixel elements are corresponding respectively, one of the first pixel elements and the corresponding second pixel element are aligned vertically.

The plurality of first pixel elements in the first pixel element array are arranged with unequal intervals, the plurality of second pixel elements in the second pixel element array are arranged with an equal interval.

The plurality of first pixel elements in the first pixel element array are arranged with an equal interval, the plurality of second pixel elements in the second pixel element array are arranged with unequal intervals.

The plurality of first pixel elements in the first pixel element array are arranged with unequal intervals, the plurality of second pixel elements in the second pixel element array are arranged with unequal intervals.

To solve the technical problem above, the disclosure further provides a curved display panel. The curved display panel includes a first curved substrate, a second curved substrate, a liquid crystal layer disposed between the first curved substrate and the second curved substrate, a first pixel element array disposed on the first curved substrate, a second pixel element array disposed on the second curved substrate. The first pixel element array at least includes a plurality of first pixel elements arranged linearly on the flattened first curved substrate, the second pixel element array at least includes a plurality of second pixel elements arranged linearly on the flattened second curved substrate correspondingly. The plurality of first pixel elements or the plurality of second pixel elements of at least one of the first pixel element array and the second pixel element array are arranged with unequal intervals.

The plurality of first pixel elements in the first pixel element array are arranged with unequal intervals, the plurality of second pixel elements in the second pixel element array are arranged with an equal interval.

The plurality of first pixel elements in the first pixel element array are arranged with an equal interval, the plurality of second pixel elements in the second pixel element array are arranged with unequal intervals.

The plurality of first pixel elements in the first pixel element array are arranged with unequal intervals, the plurality of second pixel elements in the second pixel element array are arranged with unequal intervals.

The first curved substrate is a thin film transistor array substrate, the second curved substrate is a color filter substrate.

The first pixel elements are pixel electrodes, the second pixel elements are color resistors.

Bending degrees of the first curved substrate and the second curved substrate are different.

The first pixel elements and the second pixel elements are corresponding respectively, one of the first pixel elements and the corresponding second pixel element are aligned vertically.

The first pixel elements include three first subpixel elements, the second pixel elements include three second subpixel elements. The first subpixel elements and corresponding thin film transistors on the first curved substrate are connected. The three second subpixel elements are respectively a red resistor, a green resistor and a blue resistor.

To solve the technical problem above, the disclosure further provides a curved monitor, including a curved display panel and a backlight module configured to provide backlight for the curved display panel. The curved display panel includes a first curved substrate, a second curved substrate, a liquid crystal layer disposed between the first curved substrate and the second curved substrate, a first pixel element array disposed on the first curved substrate, a second pixel element array disposed on the second curved substrate. The first pixel element array at least includes a plurality of first pixel elements arranged linearly on the flattened first curved substrate, the second pixel element array at least includes a plurality of second pixel elements arranged linearly on the flattened second curved substrate correspondingly. The plurality of first pixel elements or the plurality of second pixel elements of at least one of the first pixel element array and the second pixel element array are arranged with unequal intervals.

The plurality of first pixel elements in the first pixel element array are arranged with unequal intervals, the plurality of second pixel elements in the second pixel element array are arranged with an equal interval.

The plurality of first pixel elements in the first pixel element array are arranged with an equal interval, the plurality of second pixel elements in the second pixel element array are arranged with unequal intervals.

The plurality of first pixel elements in the first pixel element array are arranged with unequal intervals, the plurality of second pixel elements in the second pixel element array are arranged with unequal intervals.

The first curved substrate is a thin film transistor array substrate, the second curved substrate is a color filter substrate.

Bending degrees of the first curved substrate and the second curved substrate are different.

The first pixel elements and the second pixel elements are corresponding respectively, one of the first pixel elements and the corresponding second pixel element are aligned vertically.

Beneficial effects of the disclosure are as follows. Distinguishing from a conventional technique, according to the disclosure, the curved display panel includes a first curved substrate, a second curved substrate, a liquid crystal layer disposed between the first curved substrate and the second curved substrate, a first pixel element array disposed on the first curved substrate, a second pixel element array disposed on the second curved substrate. The first pixel element array at least includes a plurality of first pixel elements arranged linearly on the flattened first curved substrate, the second pixel element array at least includes a plurality of second pixel elements arranged linearly on the flattened second curved substrate correspondingly. The plurality of first pixel elements or the plurality of second pixel elements of at least one of the first pixel element array and the second pixel element array are arranged with unequal intervals, which can make the first pixel elements and the second pixel elements to be aligned, so that the curved display panel leaking light or a poor display performance caused by the color impurity can be prevented.

DETAILED DESCRIPTION OF PREFERRED EMBODIMENTS

Figure 1:
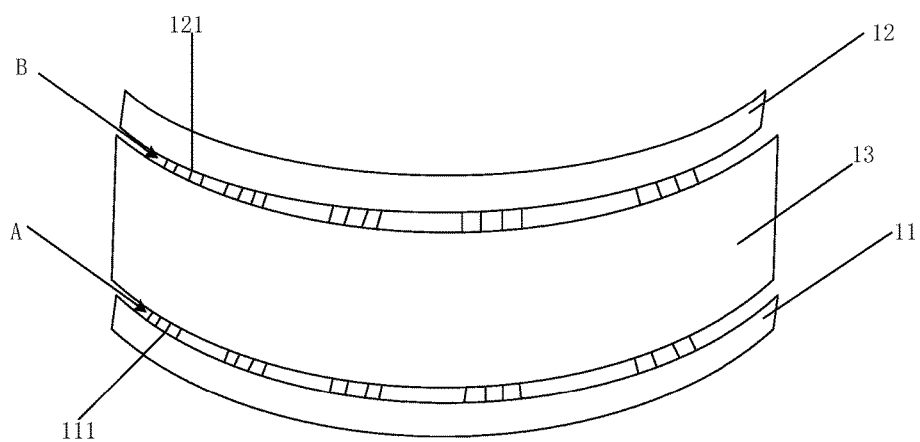
FIG. 1 is a structural schematic view of a curved display panel of the disclosure.

The disclosure will be illustrated in detail according to embodiments with reference to the accompanying drawings as follows Referring to FIG. 1, FIG. 1 is a structural schematic view of a curved display panel of the disclosure. In the embodiment, the curved display panel includes a first curved substrate 11, a second curved substrate 12, a liquid crystal layer 13 disposed between the first curved substrate 11 and the second curved substrate 12, a first pixel element array A disposed on the first curved substrate 11, a second pixel element array B disposed on the second curved substrate 12.

Figure 2:
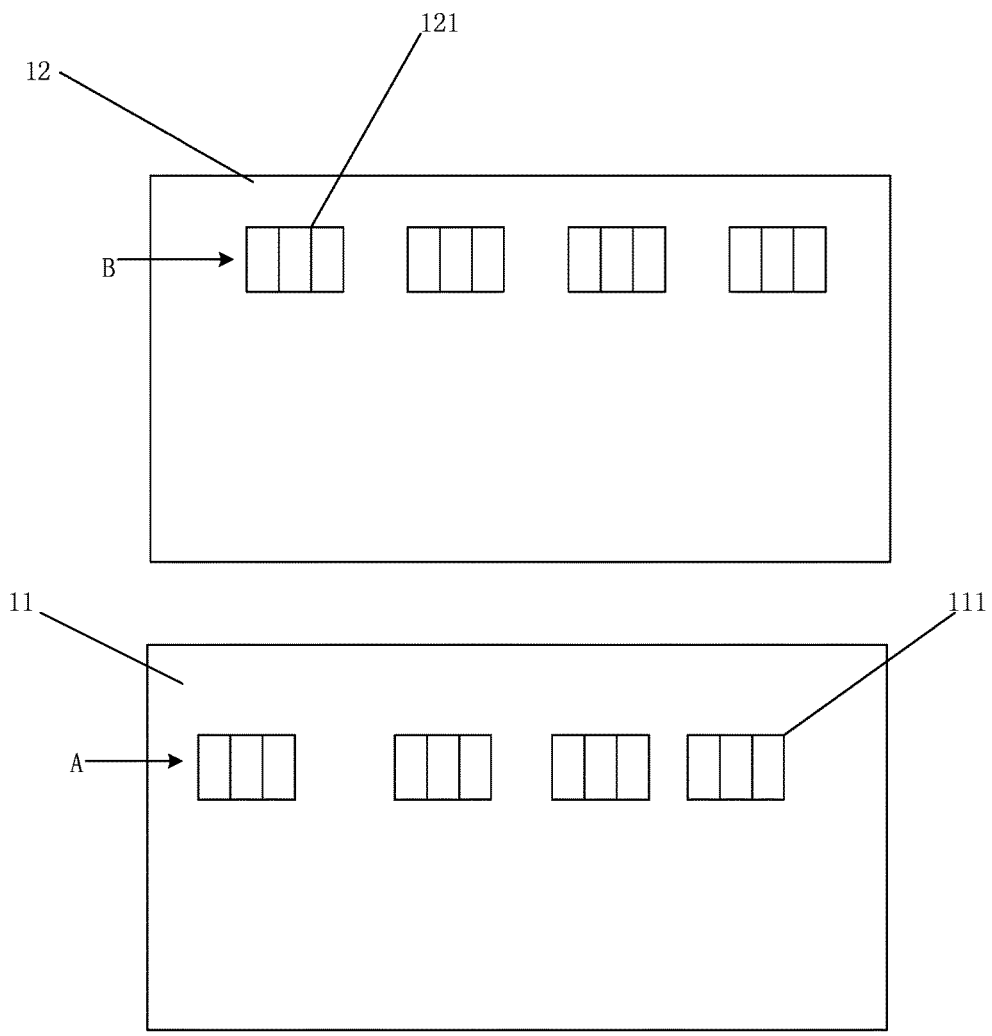
FIG. 2 is a top structural view of a flattened first curved substrate and a flattened second curved substrate of a curved display panel according to a first embodiment of the disclosure.

Referring to FIG. 1 further with FIG. 2, FIG. 2 is a top structural view of a flattened first curved substrate and a flattened second curved substrate of a curved display panel according to a first embodiment of the disclosure. The first pixel element array A at least includes a plurality of first pixel elements 111 arranged linearly on the flattened first curved substrate 11, the second pixel element array B at least includes a plurality of second pixel elements 121 arranged linearly on the flattened second curved substrate 12 correspondingly. The flattened first curved substrate 11 is a hypothetical status, which is the status of a flat panel before the curved substrate being bent, or flattening a curved panel to be a rectangular flat panel, such as flattening a side of a cylinder is a rectangular flat panel as well, similarly, the flattened second curved substrate 12 is illustrated similarly to the flattened first curved substrate 11.

The plurality of first pixel elements 111 or the plurality of second pixel elements 121 of at least one of the first pixel element array A and the second pixel element array B are arranged with unequal intervals, the intervals are intervals with a flattened status.

Preferably, in the embodiment, the plurality of first pixel elements 111 in the first pixel element array A are arranged with unequal intervals, the plurality of second pixel elements 121 in the second pixel element array B are arranged with an equal interval.

Preferably, the first curved substrate 11 is a thin film transistor array substrate, the second curved substrate 12 is a color filter substrate.

Preferably, bending degrees of the first curved substrate 11 and the second curved substrate 12 are different. In other words, curvature of the first curved substrate 11 and that of the second curved substrate 12 are different. For instance, the curvature of the first curved substrate 11 is larger than that of the second curved substrate 12, a width of the first pixel elements 111 on the flattened first curved substrate 11 is wider than a width of the second pixel elements 121 on the flattened second curved substrate 12. As another example, the curvature of the first curved substrate 11 is smaller than that of the second curved substrate 12, the width of the first pixel elements 111 on the flattened first curved substrate 11 is narrower than the width of the second pixel elements 121 on the flattened second curved substrate 12.

Preferably, the first pixel elements 111 and the second pixel elements 121 are corresponding respectively, one of the first pixel elements 111 and the corresponding second pixel element 121 are aligned vertically, in other words, a line connecting the first pixel element 111 and the corresponding second pixel element 121 is vertically directional in the figure, vertical projections of the first pixel element 111 and the corresponding second pixel element 121 are overlapped.

Preferably, the first pixel elements 111 are pixel electrodes, the second pixel elements 121 are color resistors.

Preferably, the first pixel elements 111 include three first subpixel elements, the second pixel elements 121 include three second subpixel elements. The first subpixel elements and corresponding thin film transistors on the first curved substrate are connected. The three second subpixel elements are respectively a red resistor, a green resistor and a blue resistor.

Figure 3:
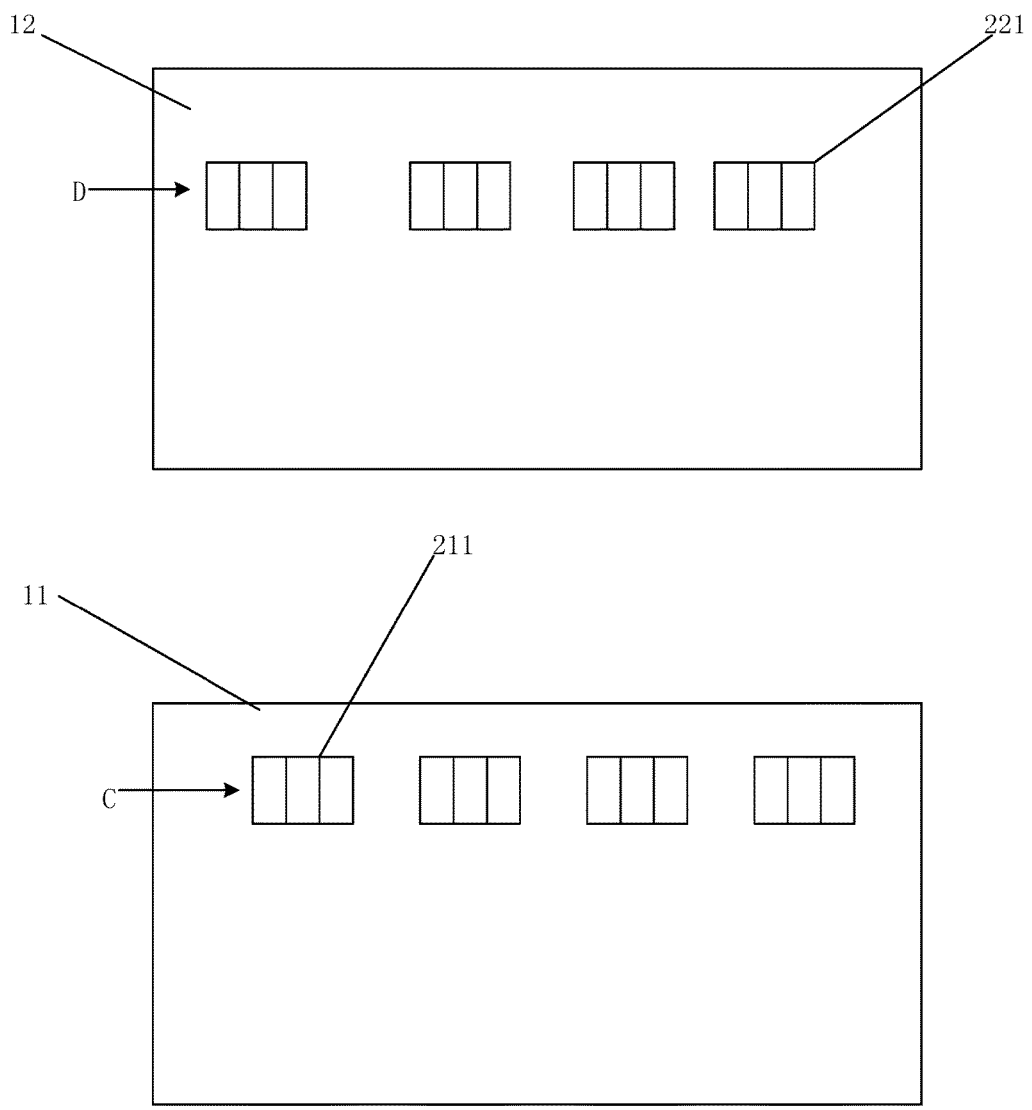
FIG. 3 is a top structural view of a flattened first curved substrate and a flattened second curved substrate of a curved display panel according to a second embodiment of the disclosure.

Referring to FIG. 3, FIG. 3 is a top structural view of a flattened first curved substrate and a flattened second curved substrate of a curved display panel according to a second embodiment of the disclosure. A difference compared with the first embodiment is a plurality of first pixel elements 211 in a first pixel element array C are arranged with an equal interval, a plurality of second pixel elements 221 in a second pixel element array D are arranged with unequal intervals.

Figure 4:
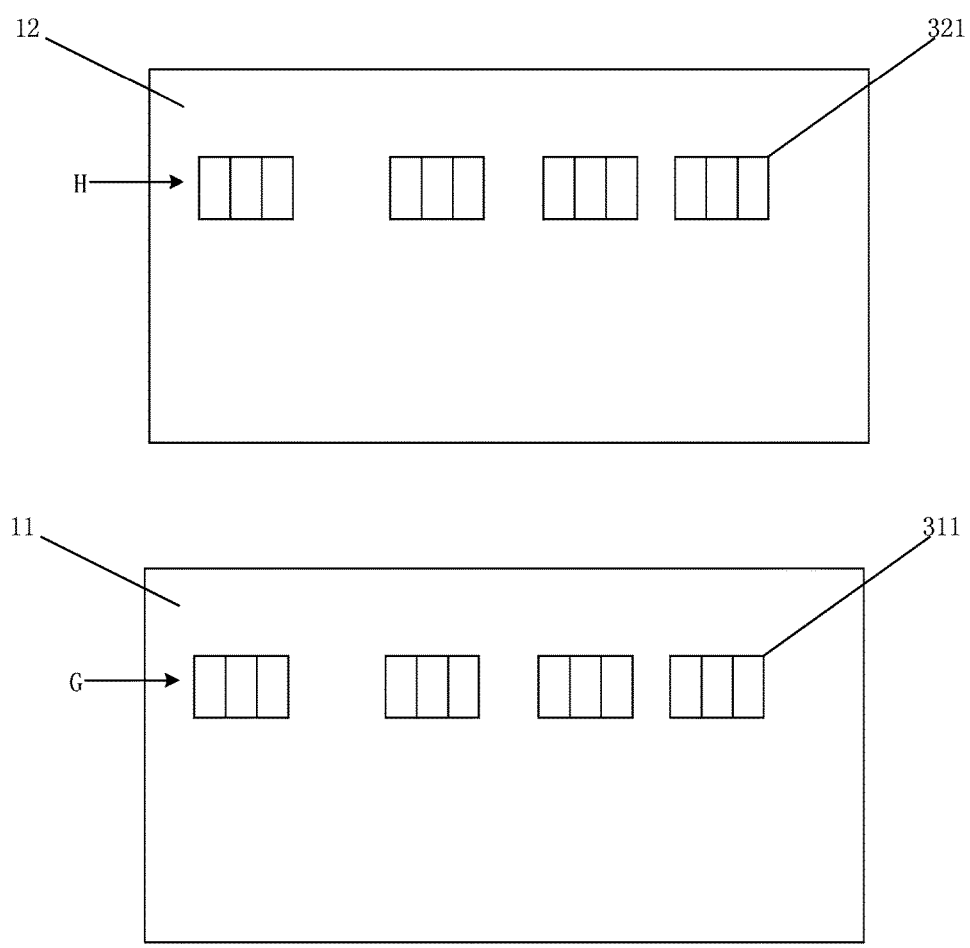
FIG. 4 is a top structural view of a flattened first curved substrate and a flattened second curved substrate of a curved display panel according to a third embodiment of the disclosure.

Referring to FIG. 4, FIG. 4 is a top structural view of a flattened first curved substrate and a flattened second curved substrate of a curved display panel according to a third embodiment of the disclosure. A difference compared with the first embodiment and the second embodiment is that a plurality of first pixel elements 311 in a first pixel element array G are arranged with unequal intervals, a plurality of second pixel elements 321 in a second pixel element array H are arranged with unequal intervals.

Interval values of the first pixel elements or the second pixel elements arranged with an equal interval or unequal intervals in the curved display panel according to the embodiments of the disclosure above are uncertain, which can be adjusted according to a parameter such as curvature of the first curved substrate and the second curved substrate.

Figure 5:
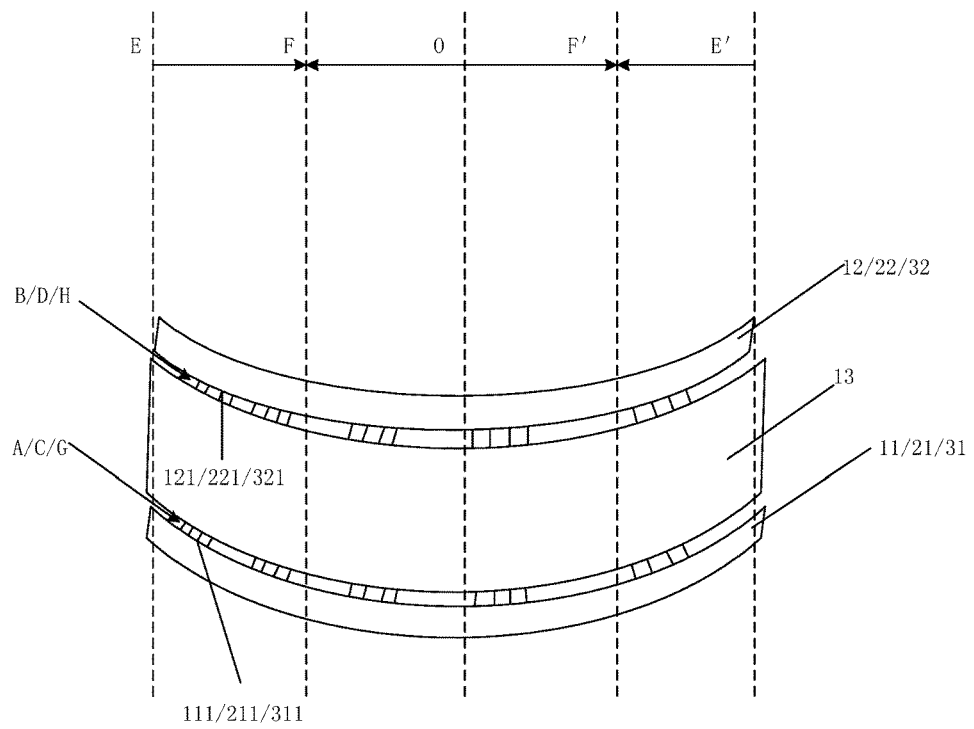
FIG. 5 is a principal schematic view of adjusting intervals of a curved display panel according to an embodiment of the disclosure.

Referring to FIG. 5, FIG. 5 is a principal schematic view of adjusting intervals of a curved display panel according to an embodiment of the disclosure. A relative degree of dislocation of the first pixel element and the corresponding second pixel element on left and right ends E and E' of the curved display panel is the minimum due to adhesion of a sealant, the relative degree of dislocation of the first pixel element and the corresponding second pixel element on a middle position O of the curved display panel is the minimum as well, a position where the relative degree of dislocation of the first pixel element and the corresponding second pixel element is the maximum is a spot away from the two ends for around one fourth of the entire width (the entire width of the curved display panel is a distance from E to E'), such as positions F and F' in FIG. 5, relative dislocation of the first pixel element and the corresponding second pixel element on the two positions are the severest, degrees of light leakage and color impurity are the severest as well.

A 55-in curved display panel popular on the market is taken as an example, a radius of curvature R is around 4000 mm (the radius of curvature is the optimum radius of curvature of a curved display panel recognized by the public currently as well), according to the radius of curvature, the maximum relative degree of dislocation of the first pixel element and the corresponding second pixel element is around 20 microns (um) after calculation and simulation, on the positions of F and F' in FIG. 5, the phenomenon and value match a practical observation and a measurement result of the curved display panel as well. Degrees of dislocation of the first pixel elements and the second pixel elements of the entire curved display panel represented by values are as shown in FIG. 5, the degree of dislocation is severer gradually from the two ends E or E' as well as the middle position O of the curved display panel to the positions F or F' away from the two ends for ¼, the maximum dislocation is at F or F', for around 20 um.

A 55-in 4K curved display panel with the radius of curvature R=4000 mm is taken as an example, a size of the first pixel elements is 315×315 um, around 4000 first pixel elements are from E to E', there are 1000 pixel elements from O to F' and from F' to E' respectively, similarly there are 1000 pixel elements from O to F and from F to E respectively as well, a relative dislocation distance of the first pixel element and the corresponding second pixel element along O (or E) to F passing each of the first pixel elements can be calculated to be around 20 um/1000=0.02 um accordingly, similarly, the relative dislocation distance of the first pixel element and the corresponding second pixel element along O (or E') to F' passing each of the first pixel elements is around 20 um/1000=0.02 um as well.

Design of intervals to solve the poor display and light leakage according to structures of the curved display panels of the first, second and third embodiments of the disclosure is specifically as follows.

In the first embodiment, the plurality of first pixel elements 111 in the first pixel element array A are arranged with unequal intervals, the plurality of second pixel elements 121 in the second pixel element array B are arranged with an equal interval. The second pixel elements 121 on the second curved substrate 12 are arranged with an equal interval from E to E'. Intervals of the first pixel elements 111 on the first curved substrate 11 from O to F are in a form of arithmetic progression, the intervals increase gradually, a common difference is 0.02 um, the arithmetic progression is specifically 315 um, 315.02 um, 315.04 um, . . . , similarly, pixel arrangements from A to F, from O to F' and from E' to F' are the same with that from O to F.

In the second embodiment, the plurality of first pixel elements 211 in the first pixel element array C are arranged with an equal interval, the plurality of second pixel elements 221 in the second pixel element array D are arranged with unequal intervals. The second pixel elements on a first curved substrate 21 are arranged with an equal interval from E to E'. Intervals of the second pixel elements 221 on the second curved substrate 22 from O to F are in a form of arithmetic progression, the intervals decrease gradually, a common difference is −0.02 um, the arithmetic progression is specifically 315 um, 314.98 um, 314.96 um, . . . , similarly, pixel arrangements from A to F, from O to F' and from E' to F' are the same with that from O to F.

In the third embodiment, the plurality of first pixel elements 311 in the first pixel element array G are arranged with unequal intervals, the plurality of second pixel elements 321 in the second pixel element array H are arranged with unequal intervals. Intervals of the first pixel elements 311 on a first curved substrate 31 from O to F are in a form of arithmetic progression, the intervals increase gradually, a common difference is 0.01 um, the arithmetic progression is specifically 315 um, 315.01 um, 315.02 um, . . . , similarly, pixel arrangements from A to F, from O to F' and from E' to F' are the same with that from O to F. Intervals of the second pixel elements 321 on a second curved substrate 32 from O to F are in a form of arithmetic progression, the intervals decrease gradually, a common difference is −0.01 um, the arithmetic progression is specifically 315 um, 314.99 um, 314.98 um, . . . , similarly, pixel arrangements from A to F, from O to F' and from E' to F' are the same with that from O to F.

In other words, in the embodiments of the disclosure, according to the first pixel elements and the second pixel elements on the curved display panel from the two ends E or E' or the middle position O of the curved display panel to the positions F or F' away from the two ends for one fourth of the entire width, intervals of pixels are arranged in the form of arithmetic progression.

Figure 6:
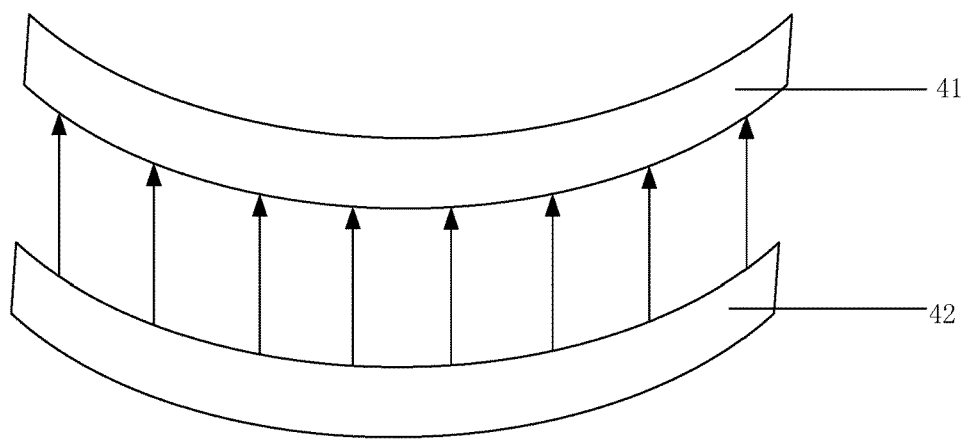
FIG. 6 is a structural schematic view of a curved monitor according to the disclosure.

Referring to FIG. 6, FIG. 6 is a structural schematic view of a curved monitor according to the disclosure. The embodiment includes a curved display panel 41 and a backlight module 42 configured to provide backlight to the curved display panel 41, the curved display panel 41 is any one described in the embodiments above.

The curved display panel described in the embodiment is a concave display panel, but obviously, the disclosure is also proper for a convex display panel, compared with the concave display panel, a difference is only laid upon an aligned bending direction.

Distinguishing from a conventional technique, according to the disclosure, the curved display panel includes a first curved substrate, a second curved substrate, a liquid crystal layer disposed between the first curved substrate and the second curved substrate, a first pixel element array disposed on the first curved substrate, a second pixel element array disposed on the second curved substrate. The first pixel element array at least includes a plurality of first pixel elements arranged linearly on the flattened first curved substrate, the second pixel element array at least includes a plurality of second pixel elements arranged linearly on the flattened second curved substrate correspondingly. The plurality of first pixel elements or the plurality of second pixel elements of at least one of the first pixel element array and the second pixel element array are arranged with unequal intervals, which can make the first pixel elements and the second pixel elements to be aligned, so that the curved display panel leaking light or a poor display performance caused by the color impurity can be prevented.

Above are merely embodiments of the disclosure, which do not limit the protection scope of the disclosure. Any equivalent structure or process according to the disclosure and the figures, or application in other relative fields directly or indirectly should be covered by the protected scope of the disclosure.

What is claimed is:

1. A curved display panel, wherein the curved display panel comprises a first curved substrate, a second curved substrate, a liquid crystal layer disposed between the first curved substrate and the second curved substrate, a first pixel element array disposed on the first curved substrate, a second pixel element array disposed on the second curved substrate, the first pixel element array at least comprises a plurality of first pixel elements arranged on the first curved substrate, the second pixel element array at least comprises a plurality of second pixel elements arranged on the second curved substrate correspondingly, the plurality of first pixel elements are arranged linearly on the first curved substrate when the first curved substrate is in a flattening status, the plurality of second pixel elements are arranged linearly on the second curved substrate when the second curved substrate is in a flattening status, bending degrees of the first curved substrate and the second curved substrate are different, the first pixel elements and the second pixel elements are corresponding respectively, wherein every two adjacent first pixel elements in a same row are spaced from each other with first intervals when the first curved substrate is in the flatting status, every two adjacent second pixel elements in a same row are spaced from each other with second intervals when the second curved substrate is in the flatting status, the first intervals between every two adjacent first pixel elements in the same row or the second intervals between every two adjacent second pixel elements in the same row are unequal when the first curved substrate or the second curved substrate is in the flatting status, such that anyone of the first pixel elements is aligned with a corresponding one of the second pixel elements in a vertical direction when the first curved substrate and the second curved substrate are in a curved status to form the curved display panel, wherein the vertical direction is perpendicular to a tangent line of the first curved substrate or the second curved substrate and passing through a middle position of the first curved substrate or the second curved substrate when the first curved substrate or the second curved substrate are in the curved status;

wherein the first intervals between every two adjacent first pixel elements in the same row are unequal with each other when the first curved substrate is in the flatting status, and the second intervals between every two adjacent second pixel elements in the same row are equal with each other when the second curved substrate is in the flatting status;

wherein the curved display panel has a left end, a right end, a middle position, a left one-fourth position where is far away from the left end with one fourth of an entire width of the curved display panel, a right one-fourth position where is far away from the right end with one fourth of the entire width of the curved display panel, during a range from the middle position to the left one-fourth position along a direction from the middle position to the left one-fourth position, or a range from the middle position to the right one-fourth position along a direction from the middle position to the right one-fourth position, or a range from the left end to the left one-fourth position along a direction from the left end to the left one-fourth position, or a range from the right end to the right one-fourth position along a direction from the right end to the right one-fourth position, the first intervals between every two adjacent first pixel elements in the same row are gradually increased when the first curved substrate is in the flatting status, and the second intervals between every two adjacent second pixel elements in the same row are equal with each other when the second curved substrate is in the flatting status.

2. The curved display panel according to claim 1, wherein the first intervals between every two adjacent first pixel elements in the same row are equal with each other when the first curved substrate is in the flatting status, and the second intervals between every two adjacent second pixel elements in the same row are unequal with each other when the second curved substrate is in the flatting status.

3. The curved display panel according to claim 2, wherein the curved display panel has a left end, a right end, a middle position, a left one-fourth position where is far away from the left end with one fourth of an entire width of the curved display panel, a right one-fourth position where is far away from the right end with one fourth of the entire width of the curved display panel, during a range from the middle position to the left one-fourth position along a direction from the middle position to the left one-fourth position, or a range from the middle position to the right one-fourth position along a direction from the middle position to the right one-fourth position, or a range from the left end to the left one-fourth position along a direction from the left end to the left one-fourth position, or a range from the right end to the right one-fourth position along a direction from the right end to the right one-fourth position, the first intervals between every two adjacent first pixel elements in the same are equal with each other when the first curved substrate is in the flatting status, and the second intervals between every two adjacent second pixel elements in the same row are gradually decreased.

4. The curved display panel according to claim 3, wherein the second intervals between every two adjacent second pixel elements in the same row are gradually decreased with a same common difference.

5. The curved display panel according to claim 1, wherein the first intervals between every two adjacent first pixel elements in the same row are unequal with each other when the first curved substrate is in the flatting status, and the second intervals between every two adjacent second pixel elements in the same row are unequal with each other when the second curved substrate is in the flatting status.

6. The curved display panel according to claim 5, wherein the curved display panel has a left end, a right end, a middle position, a left one-fourth position where is far away from the left end with one fourth of an entire width of the curved display panel, a right one-fourth position where is far away from the right end with one fourth of the entire width of the curved display panel, during a range from the middle position to the left one-fourth position along a direction from the middle position to the left one-fourth position, or a range from the middle position to the right one-fourth position along a direction from the middle position to the right one-fourth position, or a range from the left end to the left one-fourth position along a direction from the left end to the left one-fourth position, or a range from the right end to the right one-fourth position along a direction from the right end to the right one-fourth position, the first intervals between every two adjacent first pixel elements in the same row are gradually increased, and the second intervals between every two adjacent second pixel elements in the same row are gradually decreased.

7. The curved display panel according to claim 6, wherein the first intervals between every two adjacent first pixel elements in the same row are gradually increased with a same common difference, and the second intervals between every two adjacent second pixel elements in the same row are gradually decreased with the same common difference.

8. The curved display panel according to claim 1, wherein the first intervals between every two adjacent first pixel elements in the same row are gradually increased with a same common difference.

9. A curved display panel, wherein the curved display panel comprises a first curved substrate, a second curved substrate, a liquid crystal layer disposed between the first curved substrate and the second curved substrate, a first pixel element array disposed on the first curved substrate, a second pixel element array disposed on the second curved substrate, the first pixel element array at least comprises a plurality of first pixel elements arranged on the first curved substrate, the second pixel element array at least comprises a plurality of second pixel elements arranged on the second curved substrate correspondingly, the plurality of first pixel elements are arranged linearly on the first curved substrate when the first curved substrate is in a flattening status, the plurality of second pixel elements are arranged linearly on the second curved substrate when the second curved substrate is in a flattening status, wherein every two adjacent first pixel elements in a same row are spaced from each other with first intervals when the first curved substrate is in the flatting status, every two adjacent second pixel elements in a same row are spaced from each other with second intervals when the second curved substrate is in the flatting status, the first intervals between every two adjacent first pixel elements in the same row or the second intervals between every two adjacent second pixel elements in the same row are unequal when the first curved substrate or the second curved substrate is in the flatting status, such that anyone of the first pixel elements is aligned with a corresponding one of the second pixel elements in a vertical direction when the first curved substrate and the second curved substrate are in a curved status to form the curved display panel, wherein the vertical direction is perpendicular to a tangent line of the first curved substrate or the second curved substrate and passing through a middle position of the first curved substrate or the second curved substrate when the first curved substrate or the second curved substrate are in the curved status;

wherein the first intervals between every two adjacent first pixel elements in the same row are unequal with each other when the first curved substrate is in the flatting status, and the second intervals between every two adjacent second pixel elements in the same row are equal with each other when the second curved substrate is in the flatting status;

wherein the curved display panel has a left end, a right end, a middle position, a left one-fourth position where is far away from the left end with one fourth of an entire width of the curved display panel, a right one-fourth position where is far away from the right end with one fourth of the entire width of the curved display panel, during a range from the middle position to the left one-fourth position along a direction from the middle position to the left one-fourth position, or a range from the middle position to the right one-fourth position along a direction from the middle position to the right one-fourth position, or a range from the left end to the left one-fourth position along a direction from the left end to the left one-fourth position, or a range from the right end to the right one-fourth position along a direction from the right end to the right one-fourth position, the first intervals between every two adjacent first pixel elements in the same row are gradually increased when the first curved substrate is in the flatting status, and the second intervals between every two adjacent second pixel elements in the same row are equal with each other when the second curved substrate is in the flatting status.

10. The curved display panel according to claim 9, wherein the first intervals between every two adjacent first pixel elements in the same row are equal with each other when the first curved substrate is in the flatting status, and the second intervals between every two adjacent second pixel elements in the same row are unequal with each other when the second curved substrate is in the flatting status.

11. The curved display panel according to claim 9, wherein the first intervals between every two adjacent first pixel elements in the same row are unequal with each other when the first curved substrate is in the flatting status, and the second intervals between every two adjacent second pixel elements in the same row are unequal with each other when the second curved substrate is in the flatting status.

12. The curved display panel according to claim 9, wherein the first curved substrate is a thin film transistor array substrate, the second curved substrate is a color filter substrate.

13. The curved display panel according to claim 12, wherein the first pixel elements are pixel electrodes, the second pixel elements are color resistors.

14. The curved display panel according to claim 9, wherein bending degrees of the first curved substrate and the second curved substrate are different.

15. The curved display panel according to claim 9, wherein the first pixel elements and the second pixel elements are corresponding respectively, one of the first pixel elements and the corresponding second pixel element are aligned vertically.

16. The curved display panel according to claim 9, wherein the first pixel elements comprise three first subpixel elements, the second pixel elements comprise three second subpixel elements, the first subpixel elements and corresponding thin film transistors on the first curved substrate are connected, the three second subpixel elements are respectively a red resistor, a green resistor and a blue resistor.

17. A curved monitor, wherein the curved monitor comprises a curved display panel and a backlight module configured to provide backlight for the curved display panel, the curved display panel comprises a first curved substrate, a second curved substrate, a liquid crystal layer disposed between the first curved substrate and the second curved substrate, a first pixel element array disposed on the first curved substrate, a second pixel element array disposed on the second curved substrate, the first pixel element array at least comprises a plurality of first pixel elements arranged on the first curved substrate, the second pixel element array at least comprises a plurality of second pixel elements arranged on the second curved substrate correspondingly, the plurality of first pixel elements are arranged linearly on the first curved substrate when the first curved substrate is in a flattening status, the plurality of second pixel elements are arranged linearly on the second curved substrate when the second curved substrate is in a flattening status, wherein every two adjacent first pixel elements in a same row are spaced from each other with first intervals when the first curved substrate is in the flatting status, every two adjacent second pixel elements in a same row are spaced from each other with second intervals when the second curved substrate is in the flatting status, the first intervals between every two adjacent first pixel elements in the same row or the second intervals between every two adjacent second pixel elements in the same row are unequal when the first curved substrate or the second curved substrate is in the flatting status, such that anyone of the first pixel elements is aligned with a corresponding one of the second pixel elements in a vertical direction when the first curved substrate and the second curved substrate are in a curved status to form the curved display panel, wherein the vertical direction is perpendicular to a tangent line of the first curved substrate or the second curved substrate and passing through a middle position of the first curved substrate or the second curved substrate when the first curved substrate or the second curved substrate are in the curved status;

wherein the first intervals between every two adjacent first pixel elements in the same row are unequal with each other when the first curved substrate is in the flatting status, and the second intervals between every two adjacent second pixel elements in the same row are equal with each other when the second curved substrate is in the flatting status;

wherein the curved display panel has a left end, a right end, a middle position, a left one-fourth position where is far away from the left end with one fourth of an entire width of the curved display panel, a right one-fourth position where is far away from the right end with one fourth of the entire width of the curved display panel, during a range from the middle position to the left one-fourth position along a direction from the middle position to the left one-fourth position, or a range from the middle position to the right one-fourth position along a direction from the middle position to the right one-fourth position, or a range from the left end to the left one-fourth position along a direction from the left end to the left one-fourth position, or a range from the right end to the right one-fourth position along a direction from the right end to the right one-fourth position, the first intervals between every two adjacent first pixel elements in the same row are gradually increased when the first curved substrate is in the flatting status, and the second intervals between every two adjacent second pixel elements in the same row are equal with each other when the second curved substrate is in the flatting status.

\* \* \* \* \*